United States Patent (12)
Bates et al.

(10) Patent No.: US 6,944,821 B1
(45) Date of Patent: Sep. 13, 2005

(54) COPY/PASTE MECHANISM AND PASTE BUFFER THAT INCLUDES SOURCE INFORMATION FOR COPIED DATA

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,157

(22) Filed: Dec. 7, 1999

(51) Int. Cl.⁷ .............................................. G06F 15/00
(52) U.S. Cl. ...................... 715/530; 715/537; 715/539; 715/770
(58) Field of Search ............................... 715/539, 530, 715/500, 537, 770; 345/770

(56) References Cited

U.S. PATENT DOCUMENTS

| | | | |
|---|---|---|---|
| 5,111,397 A * | 5/1992 | Chirokas et al. ............ | 715/537 |
| 5,530,865 A * | 6/1996 | Owens et al. ................ | 709/313 |
| 6,199,071 B1 * | 3/2001 | Nielsen ....................... | 707/204 |
| 6,240,430 B1 * | 5/2001 | Deike et al. ................. | 715/539 |
| 6,272,505 B1 * | 8/2001 | De La Huerga ......... | 715/501.1 |
| 6,289,342 B1 * | 9/2001 | Lawrence et al. ............. | 707/7 |
| 6,345,284 B1 * | 2/2002 | Dinkelacker ................ | 715/530 |
| 6,356,287 B1 * | 3/2002 | Ruberry et al. ............. | 345/864 |
| 6,532,474 B2 * | 3/2003 | Iwamoto et al. ......... | 707/104.1 |
| 2002/0078082 A1 * | 6/2002 | Petruzzi et al. ............. | 707/500 |
| 2002/0120648 A1 * | 8/2002 | Ball et al. .................... | 707/511 |
| 2002/0129068 A1 * | 9/2002 | Takasu et al. ............... | 707/530 |
| 2003/0028609 A1 * | 2/2003 | Cahill ......................... | 709/208 |
| 2003/0041117 A1 * | 2/2003 | Dozier et al. ............... | 709/217 |
| 2005/0062892 A1 * | 3/2005 | Adams et al. .............. | 348/716 |

OTHER PUBLICATIONS

Anonymous, Copying quotations without retyping, Computimes Malaysia, Nov. 15, 1999, p.1.*
Campbell, Share text among multiple documents, PC World Online, Jun. 1, 1999, p.1.*
Anonymous, Use the right paste command option for formatting ease, Inside Microsoft Excel, Nov. 1998, vol. 5, p. 8, 8 pgs.*
McCracken et al., Office 2000 : Worth the bother?, PC World Online, Mar. 8,1999. p.1.*

* cited by examiner

Primary Examiner—Cong-Lac Huynh
(74) Attorney, Agent, or Firm—Martin & Associates, LLC; Derek P. Martin

(57) ABSTRACT

An annotated paste buffer defines a first field for copied information, and a second field for source information relating to the copied information. A copy/paste mechanism in accordance with the preferred embodiments copies the information the user selects into the first field, and gathers the appropriate information relating to the source of the copied information into the second field in the annotated paste buffer. A user may set cut/copy preferences to determine what information is gathered from the source document and placed in the second field in the annotated paste buffer. In addition, a user may set paste preferences to determine which of the source information, if any, in the second field is incorporated into a citation to the source of the information when the information is pasted into another document. In this manner a user can determine what source information is gathered, and can separately filter this information to provide citations that are tailored to different applications.

38 Claims, 7 Drawing Sheets

```
                Annotated Paste Buffer        330      340
Copied Information
    The cheetah is one of the fastest animals on the earth.  It can
reach a top speed of over 70 mph, but this speed can be maintained only
for a short distance.
                                                         350
Source Information
URL="www.cheetahinfo.com/speed"; PAGENUM="1"; TITLE="Speed of
the Cheetah"; TIME="14:21"; DATE="09/26/99"
```

FIG. 10

```
                    Word Processor
                        Document

The cheetah is one of the fastest animals on the earth.
It can reach a top speed of over 70 mph, but this speed can be
maintained only for a short distance. (reference: Speed of the
Cheetah, www.cheetahinfo.com/speed).
```

FIG. 11

```
                    Word Processor
                        Document

The cheetah is one of the fastest animals on the earth.
It can reach a top speed of over 70 mph, but this speed can be
maintained only for a short distance.[1]

_____

[1] Speed of the Cheetah, www.cheetahinfo.com/speed.
```

FIG. 12

COPY/PASTE MECHANISM AND PASTE BUFFER THAT INCLUDES SOURCE INFORMATION FOR COPIED DATA

BACKGROUND OF THE INVENTION

1. Technical Field

This invention generally relates to editing documents on a computer system and more specifically relates to an apparatus and methods for copying and pasting information from one document to another.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the IBM personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is displayed on the user's workstation.

The Internet has made vast amounts of information easily accessible. The Internet has become a valuable research tool by allowing people at their workstations to access information clear across the country or even across the world. Now a user can surf the world-wide web, find relevant information, and do a copy and paste operation to put this information into another document, such as a word processor document. However, many technical, research, and academic papers require citing the source for all relevant information that is not original to the author. Thus, when a user incorporates information from a web site into a paper, the user must then manually note the web site uniform resource locator (URL), title of the web page, and any other pertinent information relating to the web page. Once this information is manually gathered, the user can then insert this information in the form of a citation to the source of the information in his or her document. When a person copies information from different web pages or other sources of information such as CD-ROMs, this process of manually generating the cite information becomes annoying and tedious. Without a way to automatically include information relating to the source document when cutting and pasting into another document, users will have to continue the tedious process of manually entering by hand information regarding the source document.

DISCLOSURE OF INVENTION

According to the preferred embodiments, an annotated paste buffer defines a first field for copied information, and a second field for source information relating to the copied information. A copy/paste mechanism in accordance with the preferred embodiments copies the information the user selects into the first field, and gathers the appropriate information relating to the source of the copied information into the second field in the annotated paste buffer. A user may set cut/copy preferences to determine what information is gathered from the source document and placed in the second field in the annotated paste buffer. In addition, a user may set paste preferences to determine which of the source information, if any, in the second field is incorporated into a citation to the source of the information when the information is pasted into another document. In this manner a user can determine what source information is gathered, and can separately filter this information to provide citations that are tailored to different applications.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 10 is a display of the annotated paste buffer of FIGS. 3 and 7 after performing the copy operation in FIG. 9;

FIG. 11 is a display of a word processor document after pasting the information from the annotated paste buffer in FIG. 10 when the citation is a parenthetical citation; and FIG. 12 is a display of a word processor document after pasting the information from the annotated paste buffer in FIG. 10 when the citation is a footnote citation.

BEST MODE FOR CARRYING OUT THE INVENTION

According to preferred embodiments of the present invention, an annotated paste buffer copies not only the information to be copied, but information relating to the source of the copied information as well. This additional information in the annotated paste buffer can then be used when the information is pasted into a document to create an automatic citation to the source of the information. By automatically providing a citation to the source of the information, the process of writing technical, research, or other papers that cite the sources for quotes and other pertinent information is made much simpler by eliminating the time required to manually create citations.

Figure 1:
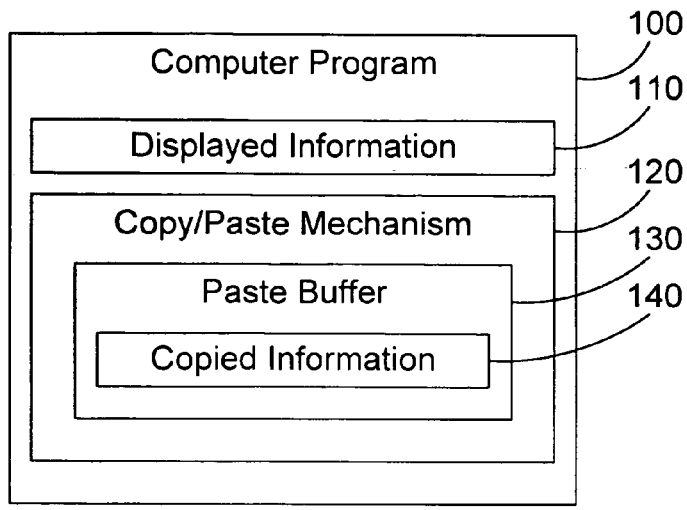
FIG. 1 is a block diagram of a prior art computer program that includes a copy/paste mechanism.

Referring to FIG. 1, a prior art computer program 100 is shown, which includes (among other things) displayed information 110 and a copy/paste mechanism 120. The copy/paste mechanism 120 includes a paste buffer 130 that contains the copied information 140.

There are different operations that are known in the art that users often perform when editing a document. The first is a cut operation. During a cut operation, the copy/paste mechanism 120 cuts (i.e., removes) information selected by the user from the displayed information 110 and places this selected information into the paste buffer 130. The second is a copy operation. During a copy operation, the copy/paste mechanism 120 copies (but does not remove) the information selected by the user in the displayed information 110 and places this selected information into the paste buffer 130. The difference between a cut operation and a copy operation is whether or not the selected information is removed from the displayed information 110 or not. Both operations are typically followed by a paste operation, which inserts the copied information 140 in the paste buffer 130 into a document at the current position of the cursor in the document. For the sake of simplicity in discussing the prior art and the preferred embodiments herein, the copy/paste mechanisms referred to herein can be used to perform both cut-and-paste operations and copy-and-paste operations. Note that the cut/copy operation and the paste operation could be performed by separate mechanisms as well.

Figure 2:
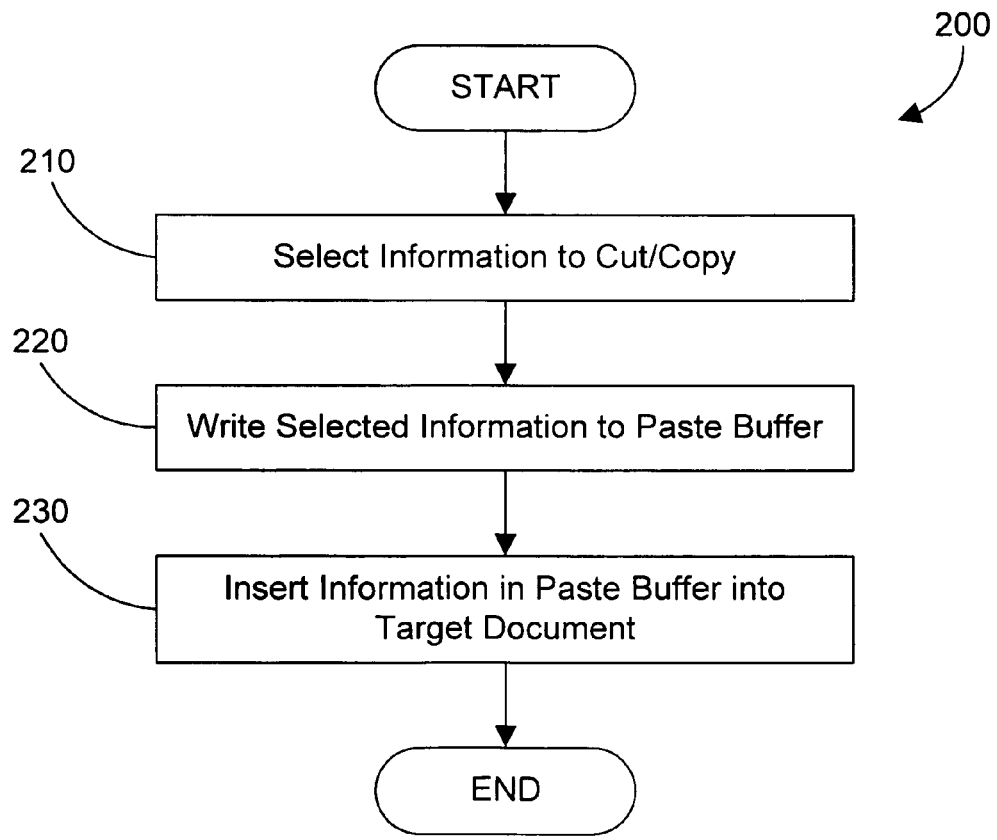
FIG. 2 is a flow diagram of a prior art method for performing a copy and paste operation in the computer program of FIG. 1.

Referring to FIGS. 1 and 2, a prior art method 200 for performing a cut/copy-and-paste operation starts with the user selecting information from the displayed information 110 to cut or copy (step 210). Displayed information 110 is part of a source document, which is simply a document from which a user can cut or copy information into the paste buffer 130. This selected information is written to the copied information field 140 in the paste buffer 130 (step 220) by the copy/paste mechanism 120. When a paste operation is then performed, the copy/paste mechanism 120 inserts the information in the copied information field 140 of the paste buffer 130 into the target document (step 230), preferably at the current cursor position. The prior art copy/paste mechanism 120 of FIG. 1 and associated method 200 of FIG. 2 are familiar to most users who have experience editing documents on a computer system.

Note that the term "source document" is used herein in its broadest sense to mean any information that can be displayed or otherwise presented to a user, from which the user may select information to be cut or copied into the paste buffer 130. The term "target document" refers broadly to any data or information to which information in the paste buffer 130 may be added. Note that the source document and target document may be the same document, but typically they are different so a user can move information from one source document to a different target document.

Figure 3:
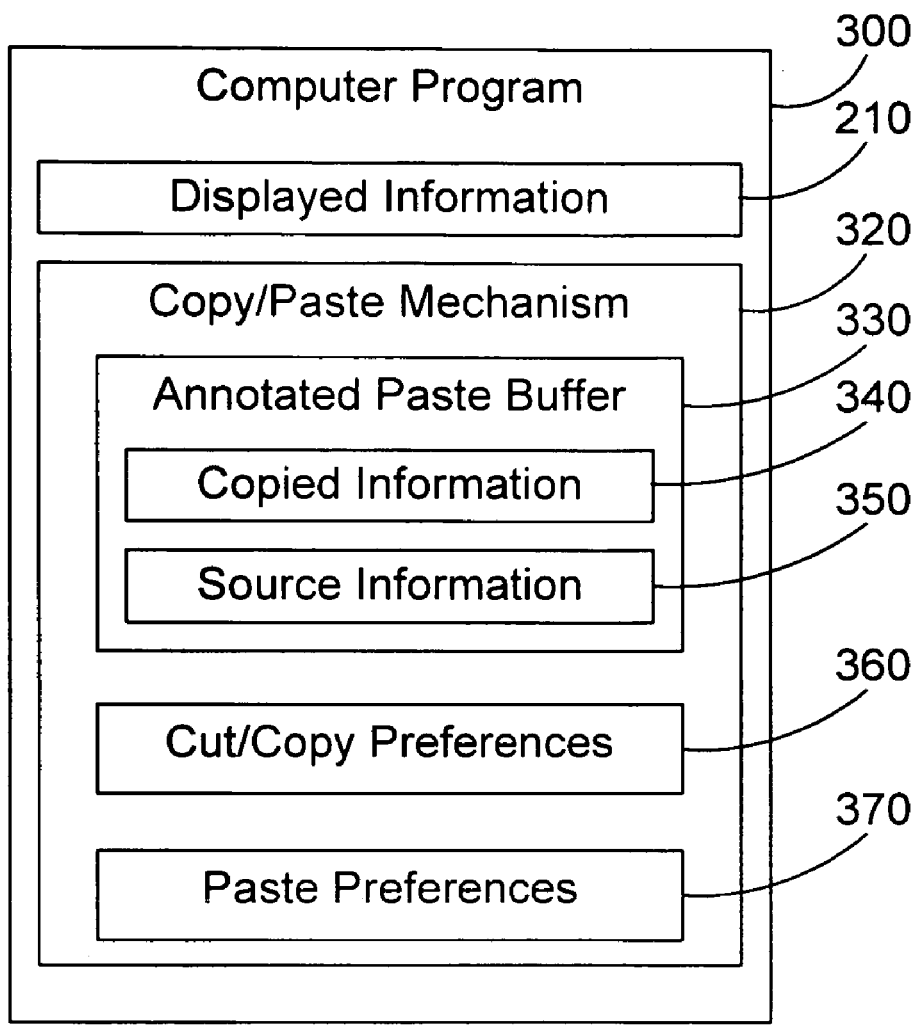
FIG. 3 is a block diagram of a computer program that has a copy/paste mechanism that includes an annotated paste buffer in accordance with the preferred embodiments.

Referring now to FIG. 3, a computer program 300 in accordance with the preferred embodiments includes displayed information 210 (from a source document), and also includes a new copy/paste mechanism 320 in accordance with the preferred embodiments. Copy/paste mechanism 320 includes an annotated paste buffer 330, cut/copy preferences 360, and paste preferences 370. The annotated paste buffer 330 includes a first field 340 for the copied information and a second field 350 for source information relating to the source of the data stored in the copied information field 340. Note that copied information 340 can be the same as the copied information 140 in the prior art (shown in FIG. 1), or may include additional information as well. The copied information field 340 receives the information the user selects before performing the cut or copy operation, while the source information field receives information from the copy/paste mechanism 320 that depends on the cut/copy preferences 360. Note that copied information field 340 may receive any type of data that may be selected by a user for cutting or copying, including without limitation text, graphics, HTML files or file portions, audio data, video data, etc. In addition, copy/paste mechanism 320 may include in copied information 340 formatting or other information relating to the information that is cut or copied. In the alternative, copy/paste mechanism 320 may strip off any or all formatting or other information relating to the information that is cut or copied before storing the information in the copied information 340. For example, when cutting or copying text that includes font attributes, the copy/paste mechanism 320 may include the font attributes in copied information 340, or may strip off the font attributes, depending on preferences set by the user that are not discussed in detail herein. In summary, copied information 340 may include or exclude formatting or other information that relates to the information that is cut or copied into annotated paste buffer 330. However, in the preferred embodiments, copied information 340 does not include any information relating to identifying characteristics of the source document from which the information was cut or copied. Certain identifying characteristics of the source document may be stored in the source information field 350, depending on the specified cut/copy preferences 360.

A user can define one or more cut/copy preferences 360, which dictate what information the copy/paste mechanism 320 stores in the source information field 350 of the annotated paste buffer 330. Cut/copy preferences may be globally set for all software applications on a particular computer system. In the alternative, cut/copy preferences may be separately defined for each application. Yet another alternative is to define a global default that can then be overridden for particular applications. The cut/copy preferences 360 in accordance with the preferred embodiments includes any information that tells copy/paste mechanism 320 what information to include in the source information field 350 of the annotated paste buffer 330, regardless of how or at what level the information is specified. As stated above, source information field 350 preferably includes data that identifies the source document from which the copied information 340 was cut or copied.

The addition of the source information field 350 is what makes the paste buffer of the preferred embodiments "annotated". The copied information 340 is accompanied in the paste buffer 330 by annotation information in the source information field 350 that identifies the source of the copied information 340 to cut/paste mechanism 330.

Cut/copy preferences 360 may vary depending on the type of reference material being accessed. For example, cut/copy preferences 360 for a web page may include the URL for the page, the page's title, the page number, table of contents, position in the web page, metatag, the time and date of creation or last modification, etc. Cut/copy preferences 360 for a CD-ROM volume may include the volume number of the CD-ROM, the author, title page number, date of creation, etc. Of course, the user could select different preferences for each different type of reference material being accessed, which would allow copy/paste mechanism 320 to dynamically determine which preferences to apply depending on the source of the information being copied. Cut/copy preferences 360 expressly include any specification of information that copy/paste mechanism 320 uses to determine what information to write to the source information field 350 of the annotated paste buffer 330. Note that it is possible for cut/copy preferences 360 to specify information that is not available for a particular source document. In this case, the source information field 350 may indicate an error by prompting the user or by placing a null value for the information that is not available. Of course, the information that is not available can simply be left off any relevant citation.

Paste preferences 370 are used to determine whether or not to create a citation when pasting the copied information 340 into a target document. If a citation is wanted, paste preferences 370 allows the user to specify the type of citation that will be created, and which source information 350 is used to automatically create the citation when pasting the copied information 340 into a document. In addition, paste preferences 370 may allow the user to specify the format for the citation, as well as the type. As is the case for cut/copy preferences 360, paste preferences 370 may also be globally set for all software applications on a particular computer system. In the alternative, paste preferences may be separately defined for each application. Yet another alternative is to define a global default that can then be overridden for particular applications. Still another alternative is to prompt the user for paste preferences each time a paste operation is performed. The paste preferences 370 in accordance with the preferred embodiments includes any information that dictates to the copy/paste mechanism 320 whether or not to create a citation using information in the source information field 350, and if so, the information from the source information field 350 to include in the citation.

Figure 4:
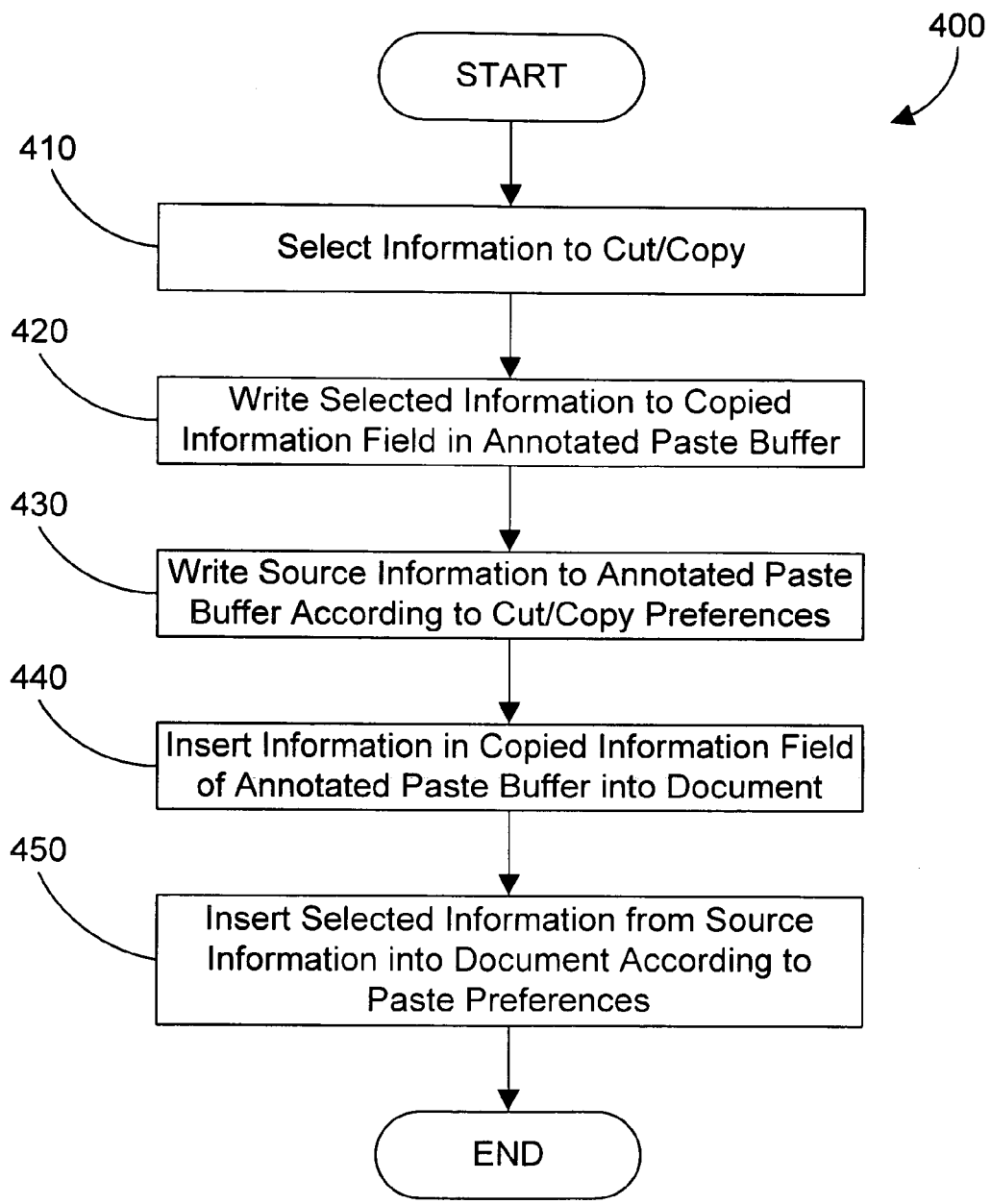
FIG. 4 is a flow diagram of a method in accordance with the preferred embodiments for performing a copy and paste operation in the computer program of FIG. 3.

A method 400 for using the annotated paste buffer 330 of FIG. 3 is shown in FIG. 4. First, information in the source document is selected to cut or copy to the annotated paste buffer (step 410). The cut or copy operation writes the selected information to the copied information field 340 of the annotated paste buffer 330 (step 420), and writes identifying information for the source document to the source information field 350 of annotated paste buffer 330 according to the specified cut/copy preferences 360 (step 430). Steps 410–430 describe the cut/copy operation. If information is stored in the annotated paste buffer 330, a paste operation may be executed by performing steps 440 and 450. First, the information stored in the copied information field 340 of the annotated paste buffer 330 is inserted into the target document (step 440). Next, the information in the selected information field 350 of the annotated paste buffer 330 is processed according to the specified paste preferences 370 (step 450). Step 450 may include the automatic generation of a citation to the source document, and the insertion of the citation in the target document, if the paste preferences specify that a citation should be automatically generated.

Figure 5:
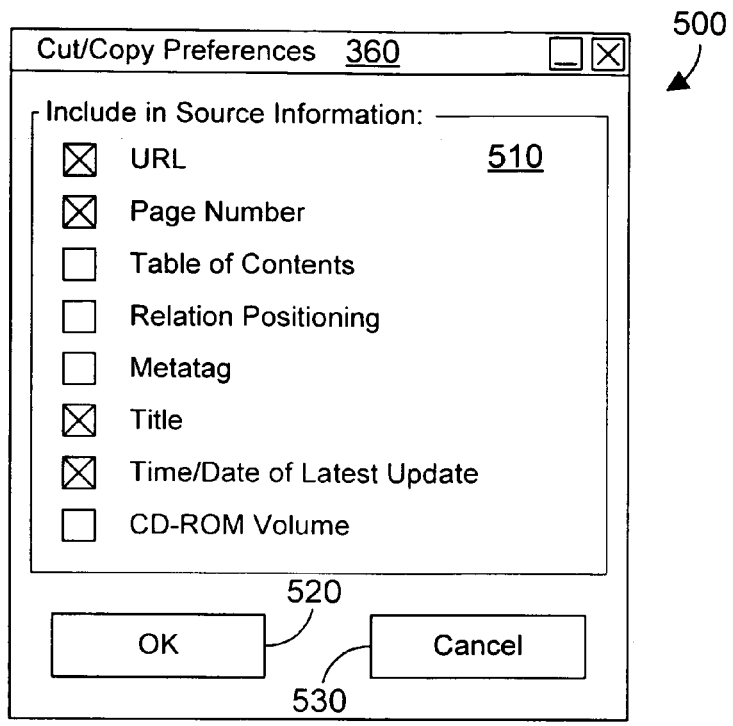
FIG. 5 is a display of a cut/copy preferences window that allows a user to select which information is gathered from the source document into the source information in the annotated paste buffer of FIG. 3.

Referring now to FIG. 5, a window 500 is shown that allows a user to set cut/copy preferences 360. Window 500 includes a display menu 510 that includes a list of information that could be stored in the source information field 350. Note that this list in FIG. 5 is presented by way of example, and any suitable information that relates to the copied information could be included in this list. Each item in the display menu 510 includes a checkbox. If the user checks the checkbox for a listed item (by clicking on the checkbox), that item is included in the source information field 350 when a cut or copy operation is performed, if the item is available for the particular document being cut or copied from. Items that are not checked are not included in the source information field 350 when performing a cut or a copy operation. For the specific window in FIG. 5, the URL, page number, title, and time/date of latest update for the document being cut or copied from will be included in the source information field 350 during a cut or copy operation. Window 500 includes an OK button 520 to accept the displayed preferences, and a cancel button 530 to close the cut/copy preferences window 500 without making changes to the cut/copy preferences 360.

The items in display menu 510 that are not checked could also be included in the source information by checking the appropriate box or boxes. For example, checking the Table of Contents box results in storing information in the source information field 350 that relates to the heading in a table of contents. For example, if the information being copied occurs in Section 7 of the Table of Contents, include "Section 7" in the source information field 350 (if a Table of Contents exists for the copied information). Relational positioning refers to the position of the copied information in relation to the whole source document. For example, if the copied information is on a web page, the relational positioning could refer to an approximate location on the web page, such as 40% down from the top of the web page. Checking the relational positioning box would thus include the position of the copied information (40% down) in the source information field 350. Checking the meta tag box in display menu 510 results in storing in the source information field 350 information in a meta tag in a web page that includes the copied information. For example, a meta tag could specify the author for a particular entry in a web page, and checking the meta tag field would result in writing the author information to the source information field 350 when the copied information is stored to the annotated paste buffer 330. Checking the CD-ROM Volume box results in storing in the source information field 350 information from a CD-ROM source regarding its volume name, assuming the source document is a CD-ROM and the volume name is available.

Figure 6:
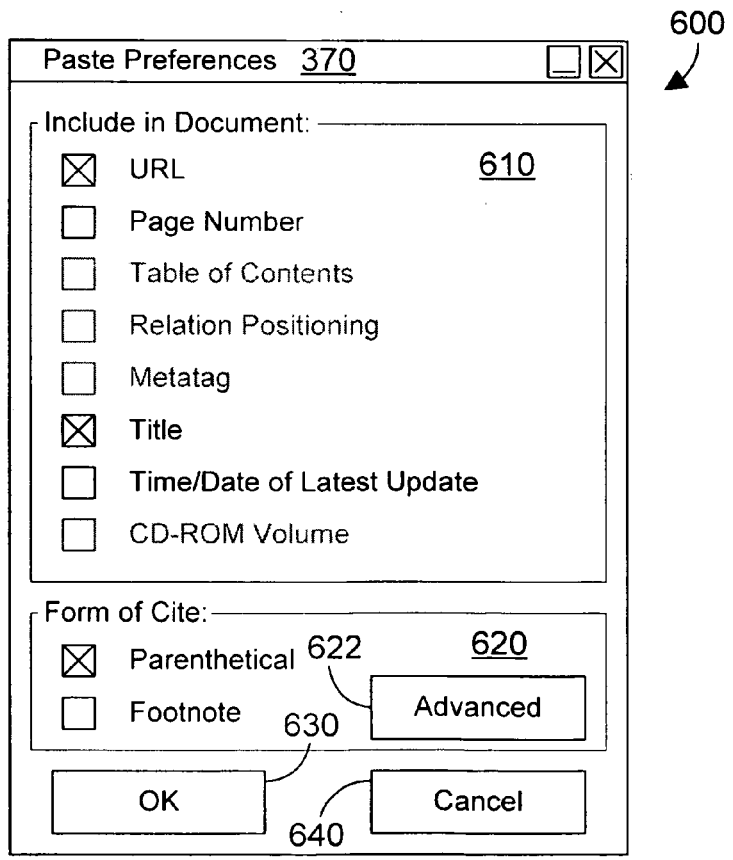
FIG. 6 is a display of a paste preferences window that allows a user to select which source information in the annotated paste buffer to include as a citation when the information is pasted into a document, and the form of the citation.

FIG. 6 shows a window 600 that allows a user to set paste preferences 370. Window 600 includes a display menu 610 that preferably includes all of the items listed in the display menu 510 of the cut/copy preferences menu. The user can then select from the list those items to include in a citation that is automatically generated when information is pasted into a document. In the preferred embodiments, window 610 allows a user to only select from the items that were selected in the display menu 510 that set the cut/copy preferences 360. Thus, the URL, page number, title, and time/date of latest update are shown in black, and any or all of these may be selected by the user in display menu 610. The items not checked in display menu 510 of FIG. 5 are displayed in gray in display window 610 and cannot be checked by the user, visually indicating that these items were not included in the cut/copy preferences 360. By displaying the paste preferences in this manner, a user will visually recognize if there is information that is needed in a citation but not currently included in the cut/copy preferences 510. This visual indication will allow the user to open the cut/copy preferences window 500 and select the needed information, which can then be selected for the paste preferences 370 when the paste preferences window 600 is displayed.

If the user does not select any of the available information in display menu 610, then no citation will be created when the information is pasted into a document. If the user selects one or more items in display menu 610, the user must then specify the form of the citation in display menu 620. For the preferred embodiments, the citation can be put in a parenthetical statement following the information, or may be placed in a footnote. In addition, clicking the advanced button 622 brings up one or more additional dialog boxes that allows the user to specify the exact form of the citation. In other words, clicking on the advanced button 622 may allow the user to specify whether the title or URL is listed first, whether or not to underline or italicize the title, etc. Once the user has set the paste preferences 370 in display window 600, the user clicks on the OK button 630, which stores these paste preferences 370. A cancel button 640 is also provided to close the paste preferences window 600 without making changes to the paste preferences 370.

In the preferred embodiments, window 600 for setting paste preferences 370 is set as a system default. Paste preferences for each application can then be individually set to customize the citation form as needed. If the user wants to be prompted for each paste operation, window 600 could also pop up with each paste operation so the user can set the information in each citation before pasting the information into the target document. These and other variations are within the scope of the preferred embodiments.

Figure 7:
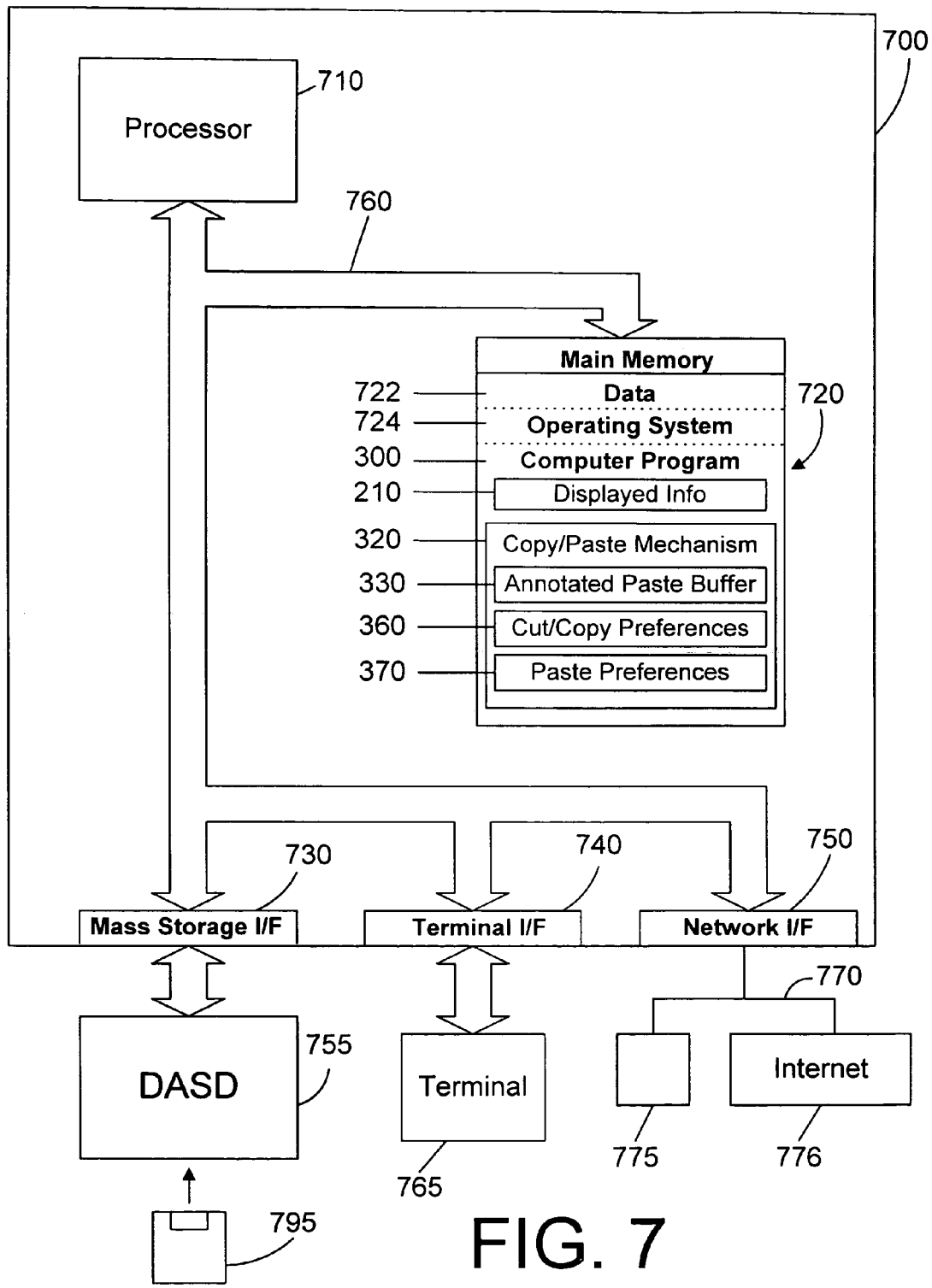
FIG. 7 is a block diagram of an apparatus in accordance with the preferred embodiments.

Referring to FIG. 7, an apparatus in accordance with the preferred embodiment is a computer system 700 that is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 7, computer system 700 comprises a processor 710 connected to a main memory 720, a mass storage interface 730, a terminal interface 740, and a network interface 750. These system components are interconnected through the use of a system bus 760. Mass storage interface 730 is used to connect mass storage devices (such as a direct access storage device 755) to computer system 700. One specific type of direct access storage device 755 is a floppy disk drive, which may store data to and read data from a floppy diskette 795.

Main memory 720 in accordance with the preferred embodiments contains data 722, an operating system 724, and a computer program 300 that includes displayed information 210 and a copy/paste mechanism 320 that includes an annotated paste buffer 330, cut/copy preferences 360 and paste preferences 370 as previously described. Note that while displayed information 210 and copy/paste mechanism 320 are shown in FIG. 7 to reside in the same computer program 300, the preferred embodiments expressly extend to any combination and configuration of display information 210 and copy/paste mechanism 320. Thus, the copy/paste mechanism 320 could be provided in the operating system 724, while the displayed information 210 is displayed in an application program. In addition, while annotated paste buffer 330 is shown in FIGS. 3 and 7 to reside within the copy/paste mechanism 320, the annotated paste buffer 330 may reside outside of any particular computer program and may be accessed by one or more copy/paste mechanisms 320. For example, there may be different software applications that each have their own copy/paste mechanisms 320 that can access information in the annotated paste buffer 330. In this manner, the copy/paste mechanism 320 in a web browser could be used to put information into annotated paste buffer 330, while a different copy/paste mechanism 320 in a word processor could be used to paste the information in the annotated paste buffer 330 into a word processing document. Note also that a copy/cut mechanism could be used to place information in annotated paste buffer 330, while a separate paste mechanism is used to paste the information in the annotated paste buffer 330 into a target document. These and other variations are expressly within the scope of the preferred embodiments.

Computer system 700 utilizes well known virtual addressing mechanisms that allow the programs of computer system 700 to behave as if they only have access to a large, single storage entity instead of access to multiple, smaller storage entities such as main memory 720 and DASD device 755. Therefore, while data 722, operating system 724, computer program 300, copy/paste mechanism 320, and annotated paste buffer 330 are shown to reside in main memory 720, those skilled in the art will recognize that these items are not necessarily all completely contained in main memory 720 at the same time. It should also be noted that the term "memory" is used herein to generically refer to the entire virtual memory of computer system 700.

Data 722 represents any data that serves as input to or output from any program in computer system 700. Operating system 724 is a multitasking operating system known in the industry as OS/400; however, those skilled in the art will appreciate that the spirit and scope of the present invention is not limited to any one operating system.

Processor 710 may be constructed from one or more microprocessors and/or integrated circuits. Processor 710 executes program instructions stored in main memory 720. Main memory 720 stores programs and data that processor 710 may access. When computer system 700 starts up, processor 710 initially executes the program instructions that make up operating system 724. Operating system 724 is a sophisticated program that manages the resources of computer system 700. Some of these resources are processor 710, main memory 720, mass storage interface 730, terminal interface 740, network interface 750, and system bus 760.

Although computer system 700 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 710. However, those skilled in the art will appreciate that the present invention applies equally to computer systems that simply use I/O adapters to perform similar functions.

Terminal interface 740 is used to directly connect one or more terminals 765 to computer system 700. These terminals 765, which may be non-intelligent (i.e., dumb) terminals or fully programmable workstations, are used to allow system administrators and users to communicate with computer system 700. Note, however, that while terminal interface 740 is provided to support communication with one or more terminals 765, computer system 700 does not necessarily require a terminal 765, because all needed interaction with users and other processes may occur via network interface 750.

Network interface 750 is used to connect other computer systems and/or workstations (e.g., 775 in FIG. 7) to computer system 700 across a network 770, and may be used to connect computer system 700 to the Internet 776. The present invention applies equally no matter how computer system 700 may be connected to other computer systems and/or workstations, regardless of whether the network connection 770 is made using present-day analog and/or digital techniques or via some networking mechanism of the future. In addition, many different network protocols can be used to implement a network. These protocols are specialized computer programs that allow computers to communicate across network 770. TCP/IP (Transmission Control Protocol/Internet Protocol) is an example of a suitable network protocol.

It is important to note that while the present invention has been described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 795 of FIG. 7) and CD ROM, and transmission type media such as digital and analog communications links.

Figure 8:
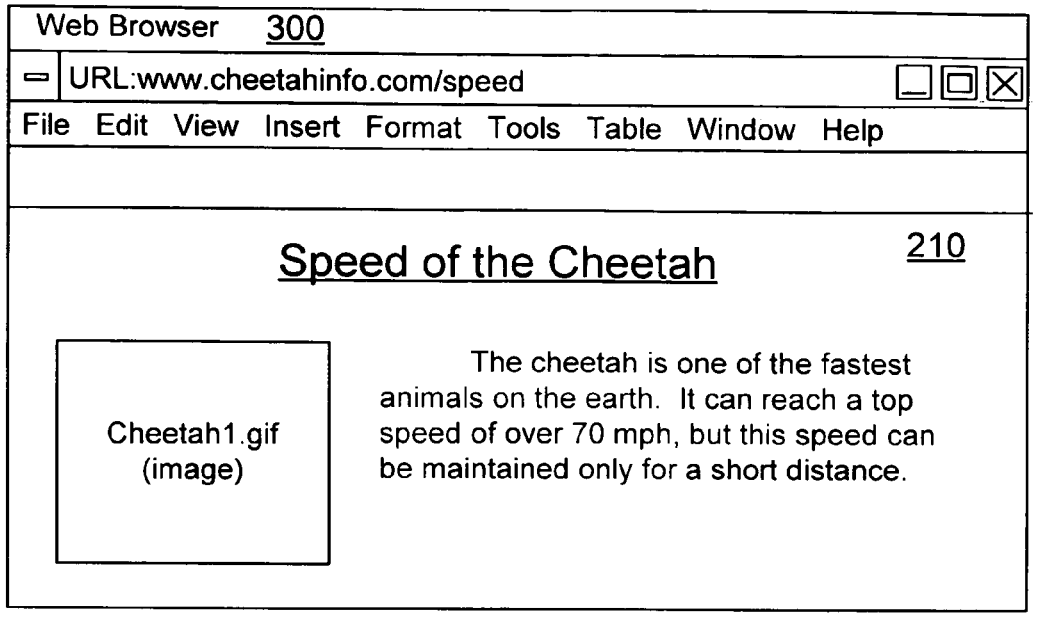
FIG. 8 is a display of a sample web page.
Figure 9:
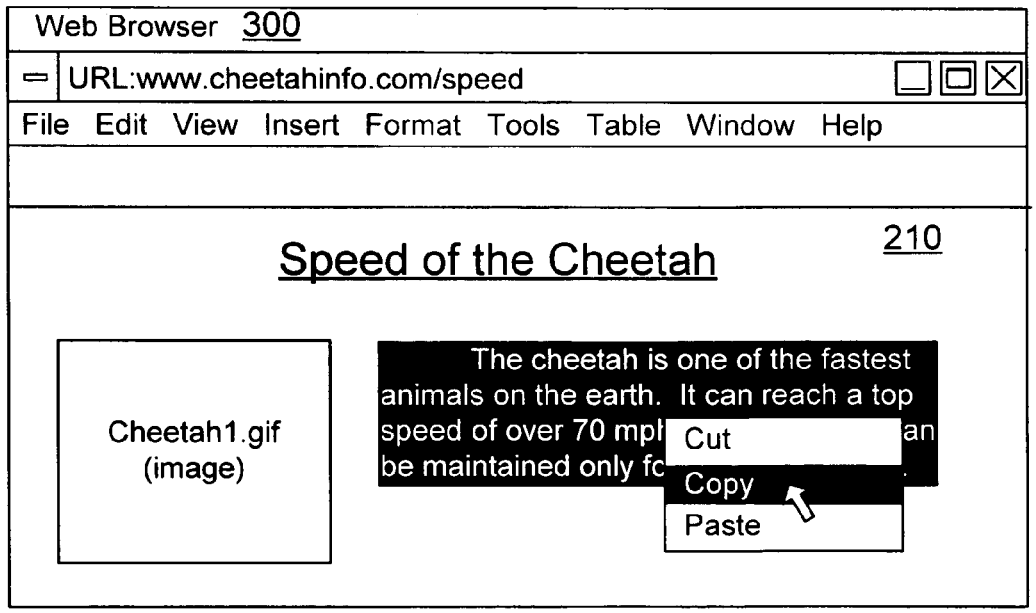
FIG. 9 is a display of the sample web page of FIG. 8 showing the selection of text and the execution of a copy function.

An example is presented in FIGS. 8–12 that illustrates the previously-described cut/copy and paste functions of the copy/paste mechanism 320 and the annotated paste buffer 330. FIG. 8 shows a display of a web page on a web browser. A web browser is one example of computer program 300 that could include a copy/paste mechanism 320 (or simply a cut/copy mechanism) in accordance with the preferred embodiments. The displayed web page is one example of displayed information 210 from which a user may select for cutting or copying. Referring to FIG. 9, the user has selected some text in the web page (as shown by the white text on the black field), and has selected a copy operation. This may be done, for example, by clicking a mouse pointer at the beginning of the text block, releasing the mouse pointer at the end of the text block, clicking on the right mouse button (right click) to display a menu, and selecting the copy operation from the menu. Performing the copy operation causes the copy/paste mechanism 320 to: 1) record the selected information in the copied information field 340 of annotated paste buffer 330, and 2) record information relating to the source of the copied information in source information field 350 of annotated paste buffer 330 according to the cut/copy preferences 360. The highlighted text in FIG. 9 is therefore stored in the copied information field 340. Assuming the cut/copy preferences are defined as shown in window 500 of FIG. 5, the URL, page number, title, and time/date of latest update for the document will be recorded in the source information field 350 to the extent that these items are available in the document from which the information was copied. For the web page of FIGS. 8 and 9, the URL is specified in the browser as www.cheetahinfo.com/speed; the page number is the first page; the title of the page is "Speed of the Cheetah"; the time of last modification is 14:21, or 2:41 PM; the date of the last modification is Sep. 26, 1999. All of this information is embedded in tags in the hypertext markup language (HTML) for the web page, and can be determined by parsing the HTML code and storing the relevant values in the source information field 350 of the annotated paste buffer 330. This information can be stored in the source information field 350 in any suitable form. In FIG. 10, this information is stored in a string of defined variables that are delimited by semicolons with the values enclosed in quotation marks. A copy/paste mechanism 320 (or simply a paste mechanism) can then process this string and pull out the information specified in the paste preferences 370 to automatically create a citation to the document from which the information was copied.

Referring now to FIG. 11, a word processor window is shown with a document. We assume that the word processor includes a copy/paste mechanism 320 (or simply a paste mechanism) in accordance with the preferred embodiments that knows how to read and process the information in the annotated paste buffer 330. When a paste operation is performed using the copy/paste mechanism in the word processor, the copied information 340 in the annotated paste buffer 330 is copied into the document at the present location of the cursor. Pertinent information from the source information field 350 of the annotated paste buffer 330 may then be included in a citation, if specified in the paste attributes 370. We assume for this example that the paste attributes are as shown in window 600 of FIG. 6, which specifies that only the URL and title will be used in a parenthetical citation. The source information in the paste buffer is then examined, and the URL and title in the source information field 350 is extracted to automatically create a parenthetical citation following the copied information that conforms to the paste preferences 370. The result is the document as shown in FIG. 11, where the copied text is followed with a citation that was automatically generated from information that was gathered when the copied information was placed into the paste buffer.

If the paste attributes were as shown in window 600 of FIG. 6, except that the footnote box was checked in display menu 620 instead of the parenthetical box, the resulting word processing document would appear as shown in FIG. 12. Note that a reference number for the footnote is inserted in the document immediately following the information from the copied information field 340 (FIG. 10), while the footnote text is located elsewhere in the document, such as at the bottom of the current page, at the end of the article, or in a bibliography following the article. In the specific example in FIG. 12, the footnote is shown displayed at the bottom of the page that includes the pasted text. Note that generating a footnote as shown in FIG. 12 requires that the word processor integrates the logic for generating the citation in its paste mechanism with its internal logic for generating footnotes.

The preferred embodiments disclosed herein provide a way to collect information regarding the source of copied information at the time the information is initially copied. This information can then be used, if desired, to automatically create a citation when the information is then pasted into a document. The preferred embodiments expressly include: a cut/copy mechanism that places information into both the copied information field and the source information field of an annotated paste buffer; an annotated paste buffer that includes a first field that contains user-selected information and a second field that contains information relating to the source of the user-selected information in field; a paste mechanism that inserts information from a first field of an annotated paste buffer into a document and that processes information in a second field of the annotated paste buffer, automatically generating a citation in the target document to the source document when appropriate; and associated methods and program products.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;

a paste buffer residing in the memory, the paste buffer including first and second fields; and a cut/copy mechanism residing in the memory that writes information selected by a user into the first field of the paste buffer, and that automatically collects and writes information relating to a source of the user-selected information in the second field of the paste buffer without further input from the user when the user-selected information is written to the first field.

2. The apparatus of claim 1 wherein the information that the cut/copy mechanism writes to the second field is determined by at least one specified cut/copy preference.

3. The apparatus of claim 1 further comprising a paste mechanism that inserts the information in the first field of the paste buffer into a document, and that processes the information in the second field of the paste buffer to determine whether or not to automatically create a citation according to at least one specified paste preference, and if so, automatically creating a citation in the document that includes information from the second field.

4. The apparatus of claim 3 wherein the citation comprises a parenthetical citation that is inserted in the document after the information in the first field that is inserted into the document.

5. The apparatus of claim 3 wherein the citation comprises a footnote citation comprising a footnote reference number and footnote text, wherein the footnote reference number is inserted in the document after the information in the first field that is inserted into the document, and wherein the footnote text is placed in a different location in the document.

6. The apparatus of claim 3 wherein the cut/copy mechanism and the paste mechanism are different portions of the same copy/paste mechanism.

7. An apparatus comprising:
at least one processor;
a memory coupled to the at least one processor;
a paste buffer residing in the memory, the paste buffer including first and second fields; and
a paste mechanism residing in the memory that inserts information in the first field of the paste buffer into a document, and that processes information in the second field of the paste buffer to determine whether or not to automatically create a citation according to at least one specified paste preference, and if so, automatically creating a citation in the document that includes information from the second field.

8. The apparatus of claim 7 wherein the citation comprises a parenthetical citation that is inserted in the document after the information in the first field that is inserted into the document.

9. The apparatus of claim 7 wherein the citation comprises a footnote citation comprising a footnote reference number and footnote text, wherein the footnote reference number is inserted in the document after the information in the first field that is inserted into the document, and wherein the footnote text is placed in a different location in the document.

10. An apparatus comprising:
a memory;
a paste buffer residing in the memory, the paste buffer including first and second fields;
means residing in the memory for copying information selected by a user into the first field in the paste buffer; and
means for automatically collecting and writing information relating to a source of the user-selected information into the second field of the paste buffer without further input from the user when the user-selected information is copied into the first field of the paste buffer.

11. The apparatus of claim 10 further comprising:
means for inserting the information in the first field of the paste buffer into a document;
means for processing the information in the second field of the paste buffer to determine whether or not to automatically create a citation according to at least one specified paste preference, and if so, automatically creating a citation in the document that includes information from the second field.

12. The apparatus of claim 11 wherein the citation comprises a parenthetical citation that is inserted in the document after the information in the first field that is inserted into the document.

13. The apparatus of claim 11 wherein the citation comprises a footnote citation comprising a footnote reference number and footnote text, wherein the footnote reference number is inserted in the document after the information in the first field that is inserted into the document, and wherein the footnote text is placed in a different location in the document.

14. An apparatus comprising:
a memory;
a paste buffer residing in the memory, the paste buffer including first and second fields;
means for inserting the information in the first field of the paste buffer into a document;
means for processing the information in the second field of the paste buffer to determine whether or not to automatically create a citation according to at least one specified paste preference, and if so, automatically creating a citation in the document that includes information from the second field.

15. The apparatus of claim 14 wherein the citation comprises a parenthetical citation that is inserted in the document after the information in the first field that is inserted into the document.

16. The apparatus of claim 14 wherein the citation comprises a footnote citation comprising a footnote reference number and footnote text, wherein the footnote reference number is inserted in the document after the information in the first field that is inserted into the document, and wherein the footnote text is placed in a different location in the document.

17. A computer-implemented method for placing information into a paste buffer, the method comprising the steps of:
copying information selected by a user into a first field in the paste buffer; and
automatically collecting and writing information relating to a source of the user-selected information into a second field in the paste buffer without further input from the user when the user-selected information is copied into the first field of the paste buffer.

18. The method of claim 17 wherein the information written to the second field in the paste buffer is determined by at least one specified cut/copy preference.

19. The method of claim 17 further comprising the steps of:
inserting the information in the first field of the paste buffer into a document;
processing the information in the second field of the paste buffer to determine whether or not to automatically create a citation according to at least one specified paste preference, and if so, automatically creating a citation in the document that includes information from the second field.

20. The method of claim 17 wherein the citation comprises a parenthetical citation that is inserted in the document after the information in the first field that is inserted into the document.

21. The method of claim 17 wherein the citation comprises a footnote citation comprising a footnote reference number and footnote text, wherein the footnote reference number is inserted in the document after the information in the first field that is inserted into the document, and wherein the footnote text is placed in a different location in the document.

22. A computer-implemented method for using information stored in first and second fields in a paste buffer, the method comprising the steps of:
   inserting the information in the first field of the paste buffer into a document;
   processing the information in the second field of the paste buffer to determine whether or not to automatically create a citation according to at least one specified paste preference, and if so, automatically creating a citation in the document that includes information from the second field.

23. The method of claim 22 wherein the citation comprises a parenthetical citation that is inserted in the document after the information in the first field that is inserted into the document.

24. The method of claim 22 wherein the citation comprises a footnote citation comprising a footnote reference number and footnote text, wherein the footnote reference number is inserted in the document after the information in the first field that is inserted into the document, and wherein the footnote text is placed in a different location in the document.

25. The method of claim 22 wherein the information stored in the second field of the paste buffer relates to a source for the information in the first field.

26. A program product comprising:
   a paste buffer that includes first and second fields;
   a cut/copy mechanism that writes information selected by a user into the first field of the paste buffer, and that automatically collects and writes information relating to a source of the user-selected information in the second field of the paste buffer without further input from the user when the user-selected information is written to the first field; and
   recordable type media bearing the paste buffer and the cut/copy mechanism.

27. The program product of claim 26 wherein the information that the cut/copy mechanism writes to the second field is determined by at least one specified cut/copy preference.

28. The program product of claim 26 further comprising a paste mechanism on the recordable type media that inserts the information in the first field of the paste buffer into a document, and that processes the information in the second field of the paste buffer to determine whether or not to automatically create a citation according to at least one specified paste preference, and if so, automatically creating a citation in the document that includes information from the second field.

29. The program product of claim 28 wherein the citation comprises a parenthetical citation that is inserted in the document after the information in the first field that is inserted into the document.

30. The program product of claim 28 wherein the citation comprises a footnote citation comprising a footnote reference number and footnote text, wherein the footnote reference number is inserted in the document after the information in the first field that is inserted into the document, and wherein the footnote text is placed in a different location in the document.

31. The program product of claim 28 wherein the cut/copy mechanism and the paste mechanism are different portions of the same copy/paste mechanism.

32. A program product comprising:
   a cut/copy mechanism that writes information selected by a user into a first field in a paste buffer, and that automatically collects and writes information relating to a source of the user-selected information in a second field in the paste buffer without further input from the user when the user-selected information is written to the first field; and
   recordable type media bearing the cut/copy mechanism.

33. A program product comprising:
   a paste mechanism that inserts information in a first field of a paste buffer into a document, and that processes information in a second field of the paste buffer to determine whether or not to automatically create a citation according to at least one specified paste preference, and if so, automatically creating a citation in the document that includes information from the second field; and
   recordable type media bearing the paste mechanism.

34. The program product of claim 33 wherein the citation comprises a parenthetical citation that is inserted in the document after the information in the first field that is inserted into the document.

35. The program product of claim 33 wherein the citation comprises a footnote citation comprising a footnote reference number and footnote text, wherein the footnote reference number is inserted in the document after the information in the first field that is inserted into the document, and wherein the footnote text is placed in a different location in the document.

36. An apparatus comprising:
   at least one processor;
   a memory coupled to the at least one processor;
   a paste buffer residing in the memory, the paste buffer including first and second fields; and
   a paste mechanism that inserts the information in the first field of the paste buffer into a document; and
   an automatic footnote generator that processes the information in the second field of the paste buffer and automatically creates therefrom a footnote in the document that includes information from the second field, wherein the footnote comprises a footnote reference number and corresponding footnote text, wherein the footnote reference number is inserted in the document after the information in the first field that is inserted into the document, and wherein the corresponding footnote text is placed in a different location in the document.

37. A computer-implemented method for using information stored in first and second fields in a paste buffer, the method comprising the steps of:
   inserting the information in the first field of the paste buffer into a document; and
   automatically creating from the information in the second field of the paste buffer a footnote in the document, wherein the footnote comprises a footnote reference number and corresponding footnote text, wherein the footnote reference number is inserted in the document after the information in the first field that is inserted into the document, and wherein the corresponding footnote text is placed in a different location in the document.

38. A program product comprising:

a paste mechanism that inserts information in a first field of a paste buffer into a document;

an automatic footnote generator that processes information in a second field of the paste buffer and automatically creates therefrom a footnote in the document that includes information from the second field, wherein the footnote comprises a footnote reference number and corresponding footnote text, wherein the footnote reference number is inserted in the document after the information in the first field that is inserted into the document, and wherein the corresponding footnote text is placed in a different location in the document; and recordable type media bearing the paste mechanism and the automatic footnote generator.

\* \* \* \* \*